R. B. PRICE.
PROCESS FOR TREATING PLASTIC MATERIAL.
APPLICATION FILED NOV. 12, 1915.
1,184,259.   Patented May 23, 1916.
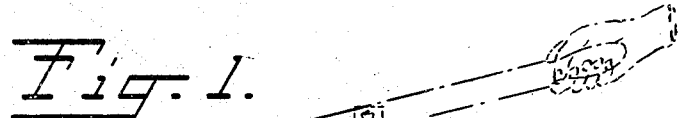
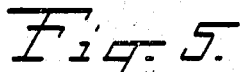
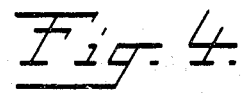
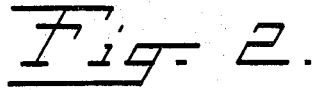
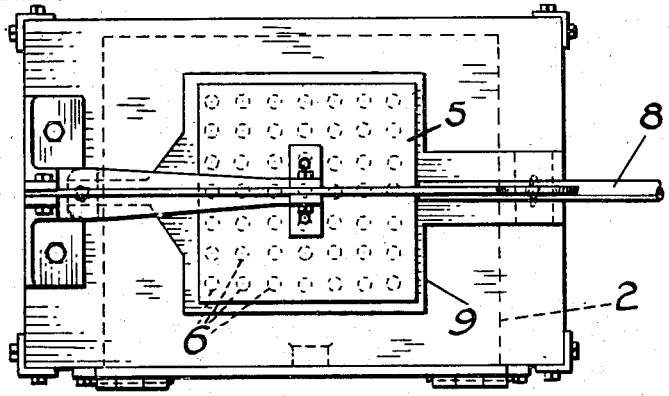
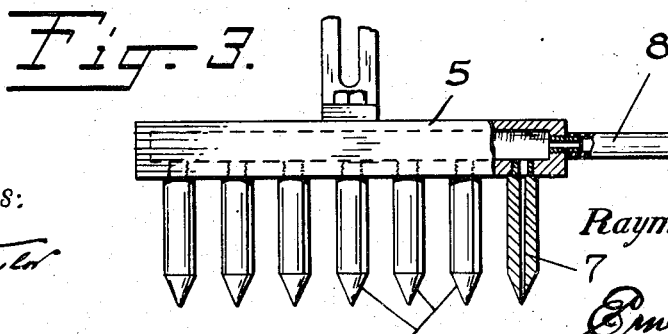
WITNESS:
S. G. Taylor
INVENTOR
Raymond B. Price,
BY
Ernest Hopkinson
HIS ATTORNEY

UNITED STATES PATENT OFFICE.

RAYMOND B. PRICE, OF NEW YORK, N. Y., ASSIGNOR TO RUBBER REGENERATING COMPANY, A CORPORATION OF INDIANA.

PROCESS FOR TREATING PLASTIC MATERIAL.

1,184,259.

Specification of Letters Patent. Patented May 23, 1916.

Application filed November 12, 1915. Serial No. 61,040.

*To all whom it may concern:*

Be it known that I, RAYMOND B. PRICE, a citizen of the United States, residing in the city of New York, county and State of New York, have invented certain new and useful Improvements in Processes for Treating Plastic Material, of which the following is a full, clear, and exact disclosure.

My invention relates to the treatment of plastic materials in their preparation for the step of molding, sheeting, tubing, or otherwise forming them into various articles of manufacture.

My invention relates particularly to the preparation of raw rubber stock prior to its being calendered, molded or formed in a tubing machine or otherwise.

The object of my invention is to provide a simple, efficient and economical process for removing from rubber or other stock and similar plastic materials entrapped or generated fluids, either gases or liquids, which would otherwise be detrimental to the articles formed therefrom because producing porosity, blisters, cracks and similar imperfections.

Briefly stated my invention comprises perforating or puncturing the stock being treated with a multiplicity of hollow needles the interiors of which are connected with a source of suitable vacuum whereby the fluids contained in the material are extracted therefrom and the cavities in which they were contained enabled to close under pressure, making a homogeneous solid body of the material.

For a description of one form of apparatus for carrying out my improved process reference may be had to the following specification and to the accompanying drawing forming a part thereof, in which—

Figure 1 is a side elevation of the apparatus showing the material being treated in section; Fig. 2 is a plan view thereof; Fig. 3 is a side elevation, partly in section, of one form of conductors or hollow needles and carrier which may be employed in the essential part of the process; Fig. 4 is a longitudinal sectional view of a modified form of needle; and Fig. 5 is still another modification of the same.

Referring to the drawing, the numeral 1, indicates a suitable table or working slab which is preferably steam or otherwise heated, and in the present device, by being made in this form of a hollow platen having interior chambers as indicated by dotted lines in Figs. 1 and 2, and by the numeral 2, steam or other heating medium being supplied thereto through the pipes 3 and 4. The heat is for the purpose of rendering the material sufficiently plastic to be easily worked if its condition is such as to require its being softened while being treated.

Slidably mounted upon a suitable support and adapted to be reciprocated vertically above the table 1 is a needle carrier 5 made hollow as indicated in Fig. 3 and having a series of needles 6 projecting from the lower side. The needles are provided with interior conduits which communicate with the interior of the carrier 5 and whose outer ends are located slightly at one side of the points of the needles. By this arrangement the tendency of the needles to become clogged with the material being treated is obviated. The interior of the carrier 5 is connected with a suitable source of reduced pressure or vacuum, preferably, by a flexible pipe 8. Also supported above the table 1 is a stripper plate 9 having suitable holes through which the needles 6 may pass. The stripper plate frees the needles of the material when the carrier is raised if the material is of such a consistency or the needles are of such a material that they tend to adhere to each other.

In the carrying out of my improved process a mass or lump of the material is placed upon the table 1 beneath the stripper plate and the needle carrier caused to reciprocate vertically so that the needles penetrate the mass at a multiplicity of points. The needles in passing through the material subject its interior to the action of the vacuum thereby withdrawing or abstracting the entrapped fluids which would otherwise be entrapped therein. The material is moved about on the table and kneaded to subject all parts of the mass to the action of the needles while the carrier is being reciprocated until all of the parts of the mass are freed from the said fluids. The material is then ready for further treatment or is formed into articles of manufacture.

It is obvious that the improved process may be carried out with a variety of different apparatus, either power or manually operated.

Instead of forming the needles 6 of metal with a central longitudinal bore, I may form them of porous material such as porcelain in which case no central bore would be necessary, the porosity of the porcelain providing adequate exit for entrapped fluids. I also contemplate forming the needles with the ducts 7 therein communicating laterally to a circumferential groove instead of extending them to the points of the needles as shown in Fig. 3 of the drawing.

While the apparatus which I have shown is directed more particularly to illustrating a means for penetrating the material with the needle-like members, it will be understood that my method is not confined to the employment of such apparatus. For instance, where mechanical pressure is to be applied simultaneously with the treatment by the vacuum, it would be desirable to use such an apparatus as that shown and described in my co-pending application for Letters Patent for improvements in apparatus for treating plastic materials filed November 12, 1915, Serial Number 61,038.

Having thus described one form of my invention, what I claim and desire to protect by Letters Patent is:

1. The process of treating plastic material which comprises subjecting the interior thereof to the action of a multiplicity of tubular conductors and conducting fluid substances away through said conductors.

2. The process of treating plastic material which comprises forcing into the interior thereof a multiplicity of conductors and creating within said conductors a reduced air pressure.

3. The process of treating plastic materials which comprises forcing into the interior thereof a plurality of hollow open-ended needles and creating within said needles a reduced air pressure.

4. The process of treating a vulcanizable plastic mass which consists in penetrating the interior thereof with an open end of a hollow device, and while thus penetrated, subjecting the mass to the action of mechanical compression for driving the fluids therein-contained therefrom and into the hollow device through said opening.

Signed this 30 day of October, 1915.

RAYMOND B. PRICE.